United States Patent [19]

DeStepheno

[11] 4,257,632

[45] Mar. 24, 1981

[54] DETACHABLE LATCHING DEVICE FOR CLOSURE PANELS

[75] Inventor: George E. DeStepheno, San Dimas, Calif.

[73] Assignee: Le Van Specialty Co., Inc., Industry, Calif.

[21] Appl. No.: 5,460

[22] Filed: Jan. 22, 1979

[51] Int. Cl.³ .............................................. E05C 17/32
[52] U.S. Cl. ............................. 292/263; 292/DIG. 49
[58] Field of Search ....... 292/263, 278, 268, DIG. 49; 49/397; 98/2.12, 2.14

[56] References Cited

U.S. PATENT DOCUMENTS

| 3,974,753 | 8/1976 | Blomgren et al. | 49/397 X |
| 4,067,605 | 1/1978 | Green et al. | 98/2.14 X |

Primary Examiner—Richard E. Moore
Attorney, Agent, or Firm—Francis X. LoJacono

[57] ABSTRACT

A detachable latching device adapted for use with movable panels, and more particularly for use in combination with removable panels and the related fixed frame structure such as employed in sun-roofs for vehicles, wherein the device comprises a toggle-jointed latch having a pair of toggle bars wherein one defines a latch-handle-link member and the other a toggle arm, each being pivotally connected to the other at one end. The opposite end of the handle-link member is pivotally connected to a mounting bracket attached to the panel; and the toggle bar is pivotally connected to a demountable anchor bracket removably secured to the fixed frame structure wherein the anchor bracket includes a pair of oppositely disposed cleat members that are removably lockable to the fixed frame structure.

10 Claims, 11 Drawing Figures

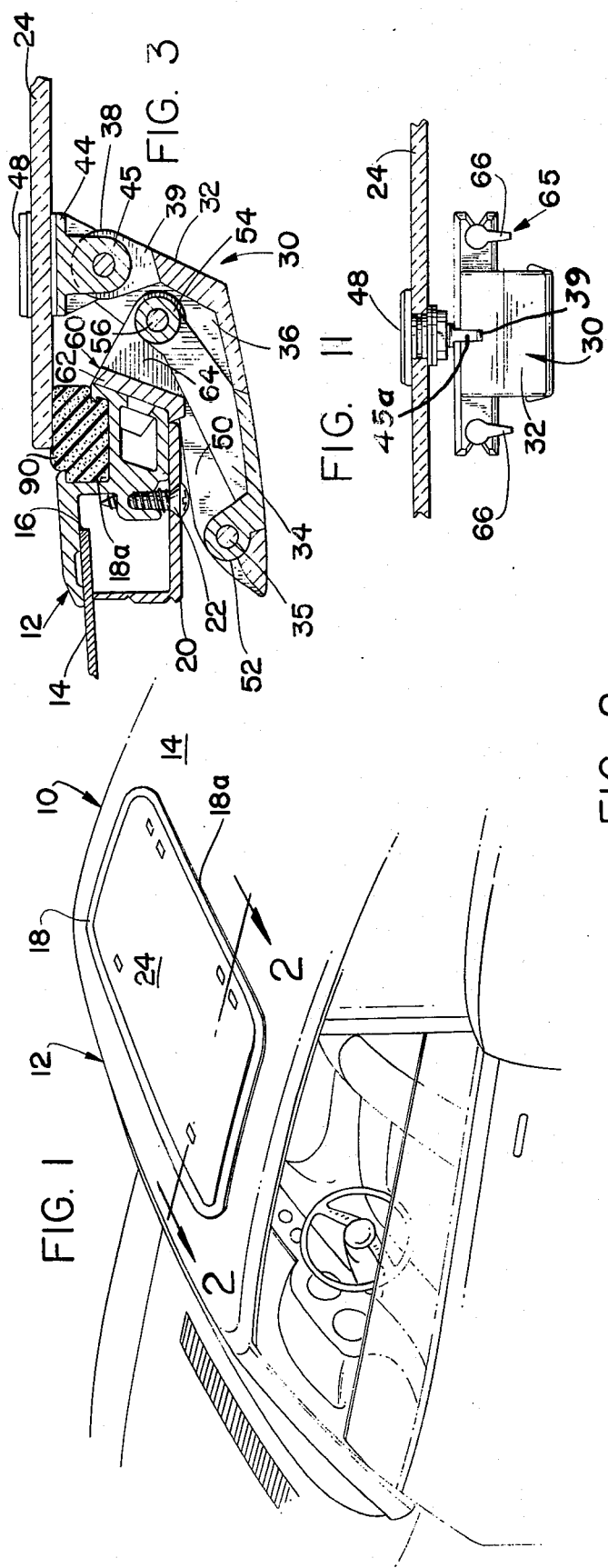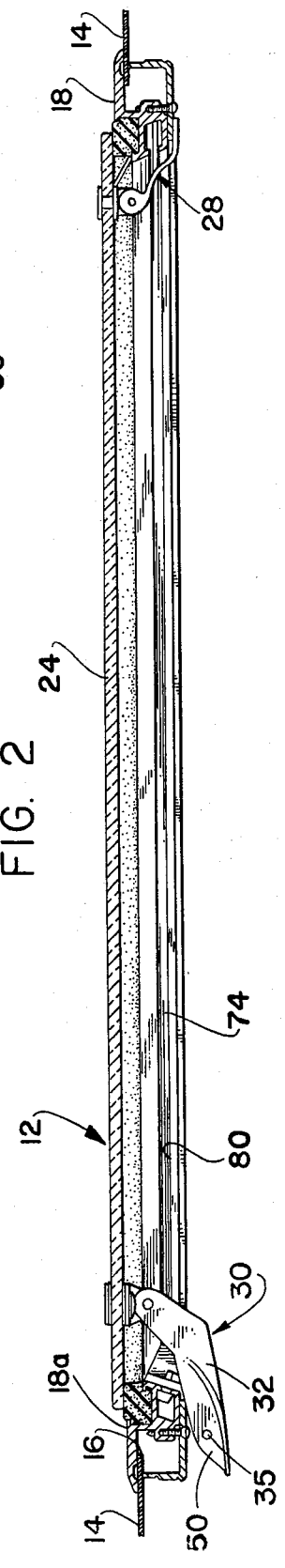

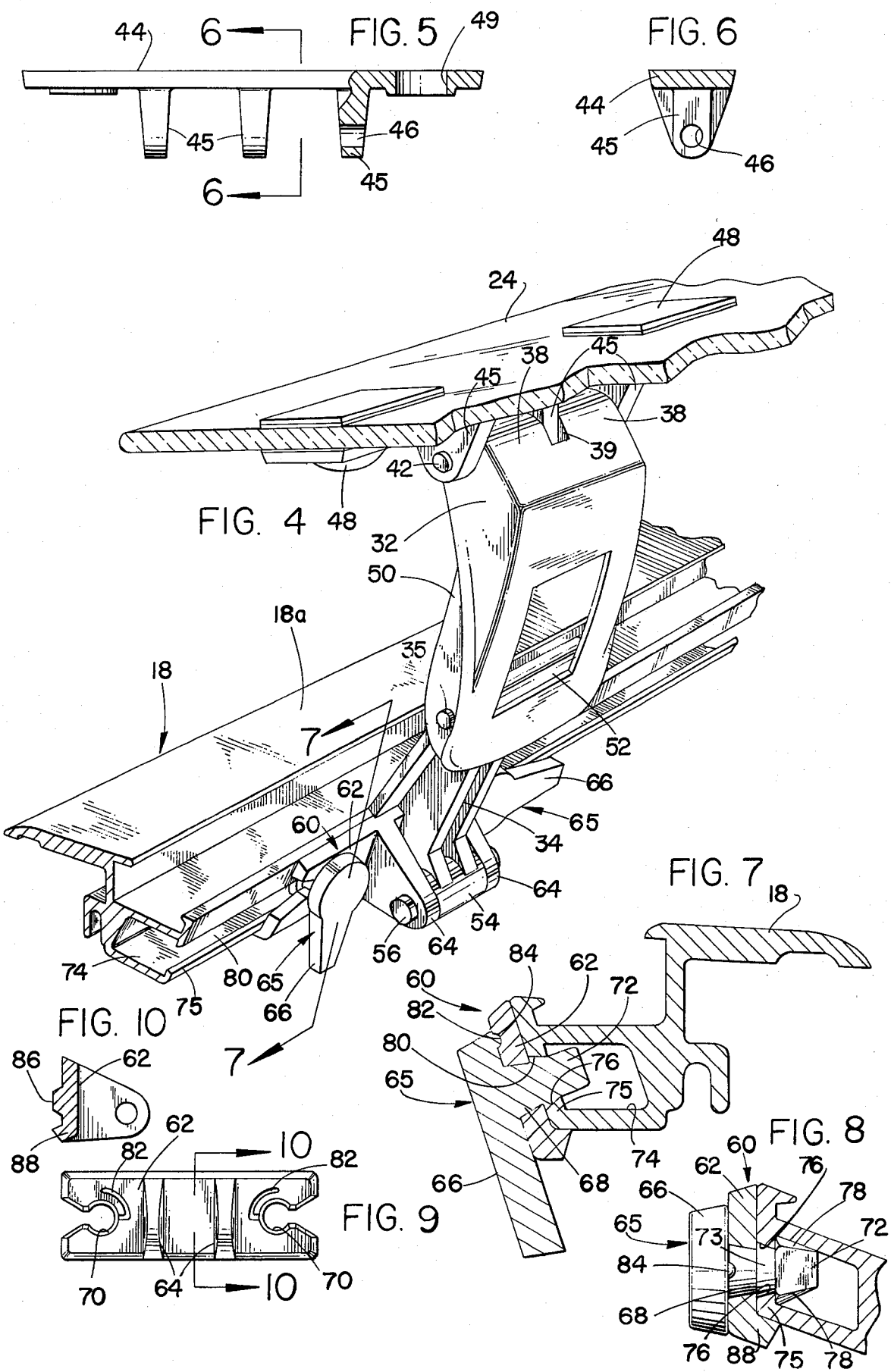

DETACHABLE LATCHING DEVICE FOR CLOSURE PANELS

BACKGROUND OF THE INVENTION

1. Field of the Invention

This invention relates generally to a latching device for movable panels, and more particularly to a detachable latching device that is easily removed from an associated fixed frame structure.

2. Description of the Prior Art

As is well known in the art, various problems and difficulties are encountered in providing suitable latching means related to panels, such as the window panels associated with sun roof units for automobiles.

Many types of latching devices are used for the opening of such panels or windows. However, these devices have features that restrict their use due to the growing demands for safety requirements for vehicles.

Sun-roof units of the type adapted for retrofit installations generally provide for vent windows to be mounted in an opening extending across the major width of a vehicle roof, and preferably positioned directly over the driver and passenger front seats. A frame structure having a generally rectangular configuration is affixed within the opening in the vehicle roof to which the hinges and latches are attached, so as to support and secure the window panel in place. Accordingly, the window panel is removably mounted in the opening having the hinge members positioned along the forward edge of said frame opening. The rear edge thereof is pivoted between a closed, sealing position and an open, forwardly inclined, venting position.

Detachable latching mechanisms, as seen in U.S. Pat. No. 3,974,753, are so designed as to be detachable from the window panel, whereby the panel can be completely removed from the fixed frame structure. As is indicated therein, when the latching mechanism is disconnected, the greater part thereof is still secured to the fixed frame. This then creates a safety hazard, whereby the mechanism is either left to hang within the vehicle or protrude within the frame opening.

Thus, to the applicant's knowledge, there is at the present time no latching mechanism that can be simple and easily detached from the frame structure, thereby leaving the passenger area and the frame opening free from protruding members.

There are several foreign countries at present that will not allow the use of vehicle sun roofs, due to these protruding members within the vent openings.

SUMMARY OF THE INVENTION

The present invention comprises the combination of a specially designed frame structure that is capable of releasably receiving a detachable latching device which comprises a handle link member and a pivotally connected toggle arm, wherein the handle link is also pivotally attached to a window-panel-mounting bracket which is secured adjacent the rear transverse edge of the panel. The toggle arm is pivotally attached to a demountable anchor bracket which includes a pair of lockable cleat members. These cleat members are adapted to be releasably locked to the fixed frame structure of the unit. Thus, the window panel can be positioned in a vented open mode by operating the latch mechanism to an extended position; that is, the handle link is pulled outwardly to cause the handle link and the toggle arm to articulate to a fully extended mode, thereby raising the rear edge of the panel about the fixed hinged members that are forwardly mounted thereon.

However, when the entire window panel is to be removed, each cleat member of the anchor bracket is turned to an unlocked position, thereby releasing the anchor bracket from the fixed frame structure. The window can be raised so as to allow the forward hinge members to also disengage from the frame structure. Once the window panel is removed, the frame opening is cleared of protruding or hanging members; and thus there no longer exists a safety hazard to affect the movements of the passengers within the vehicle.

OBJECTS AND ADVANTAGES OF THE INVENTION

The present invention has for an important object a provision wherein a window panel can be totally removed from a fixed frame structure, and whereby the latch device and hinge members are also removed from the structure so as not to present a safety hazard to the passengers within the vehicle when the panel is removed therefrom.

It is another object of the invention to provide a detachable latching mechanism for paneled sun-roof devices wherein the latching mechanism includes a removable anchor bracket having locking cleat members.

It is still another object of the invention to provide a device of this character that includes a frame structure that is adapted to releasably receive the locking cleat members.

It is a further object of the invention to provide a detachable latching device that is simple to remove and to replace, and that does not need any special tools or pins to remove or insert.

It is a still further object of the invention to provide a device of this character that is relatively inexpensive to manufacture, service and maintain.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a pictorial view of a portion of a vehicle having a sun-roof unit mounted therein;

FIG. 2 is an enlarged, transverse, cross-sectional view taken substantially along line 2—2 of FIG. 1, showing the placement of the latching device and the forwardly positioned hinges;

FIG. 3 is an enlarged cross-sectional view of the latching device shown in a closed or latched mode of operation;

FIG. 4 is an enlarged pictorial view of the detachable latching device shown in an open mode, whereby the rear edge of the window panel is spaced above the frame structure;

FIG. 5 is a top plan view of the panel-mounting bracket with a portion thereof in section;

FIG. 6 is a cross-sectional view of the mounting bracket taken along line 6—6 of FIG. 5 thereof;

FIG. 7 is an enlarged cross-sectional view taken substantially along line 7—7 of FIG. 4, showing the locking cleat member in an unlocked position;

FIG. 8 is a similar cross-section to that of FIG. 7, except that the locking-cleat member is in a locked position;

FIG. 9 is a front plan view of the anchor bracket; and

FIG. 10 is a cross-sectional view taken along line 10—10 of FIG. 9;

FIG. 11 is an elevational view of the latching device illustrating an alternative embodiment of the mounting bracket supported by the panel closure member.

DESCRIPTION OF THE PREFERRED EMBODIMENT

Referring more particularly to FIG. 1, there is shown a portion of a vehicle such as an automobile, generally indicated at 10, wherein a roof-vent unit, designated at 12 and known as a sun roof, is installed and mounted in an opening provided in the car roof wall 14. Sun roofs, when mounted, are generally located so as to be positioned directly over the driver and passenger front seat areas, and extend transversely across the major portion of the width of roof 14.

Opening 16 formed in roof 14 is seen in FIG. 2 and partially in FIG. 3. Sun roof 12 comprises a substantially fixed frame structure 18 having a generally rectangular, peripheral configuration that is received in opening 16 and attached thereto by frame-ring member 20, wherein a plurality of ring screws 22 attach frame-ring member 20 to the main frame structure 18.

It should be understood at this time that the use of the present invention is not limited to sun roofs and may be applied to other structures that require movable and demountable panels, such as the window panel 24, which forms the closure panel for the sun roof 12, as herein described.

Accordingly, the window panel 24 is supported by main frame structure 18 wherein a peripheral sealing gasket 26 is arranged to engage panel 24 in a sealed closed mode, as seen in FIGS. 2 and 3. The closure panel 24 is carried on main frame member 18, wherein there is employed a pair of hinge means 28 and at least one detachable latching mechanism defining the present invention and indicated at 30. Hinge means 28 are located along the forward edge of unit 12, and interconnect frame 18 and panel 24, to allow panel 24 to open to a vented position when the latching mechanism is actuated and released from a locked position to an open position, as seen in FIG. 4.

Since the hinge members are not part of the present invention, it should be noted that any suitable releasable hinge means can be employed therewith. That is, the hinges used should be of a type that can be readily removed or separated in part from the main frame so as to allow panel 24 to be completely removed from the main frame.

As for the detachable latching mechanism 30, one or more may be employed by locating each latching unit 30 along the rearward portion of the sun roof 12. That is, the rearward edge of panel 24 is interlocked to the rear section 18a of the main frame 18. The latching mechanism 30 of the present invention is so designed as to latch the panel in a sealed-closed position, and when actuated further allows the panel to be positioned in an open mode for venting, as seen in FIG. 4. In addition, however, the latch 30 and hinges 28 can be disengaged, whereby the closure panel is completely separated and removed from the frame structure 18, thereby leaving a clear and free opening or passageway through the roof of the vehicle.

The detachable latching device 30 comprises a toggle jointed latch having a pair of toggle bars, wherein the first toggle bar is defined by a latch-handle member 32 which is toggle jointed, together with a toggle arm member 34 representing the second toggle bar. The members 32 and 34 are provided with an articulated joint by means of pin 35 which allows a geniculating action between latch handle 32 and toggle arm 34, whereby toggle arm 34 is foldable within handle 32 when in a closed mode, both toggle members being fully extended when in an open mode.

Latch handle 32 comprises a channel-shaped housing 36 having at its upper end a pair of ear members 38 defined by groove 39, wherein bores 40 are disposed through the ear members so as to receive a pivot pin 42, thus establishing a connecting pivot means between handle 32 and a mounting bracket 44, mounting bracket being shown in FIG. 4 as having a plurality of extended ear members 45 with bores 46 to receive pin 42 therethrough. Ears 38 of handle 32 are thereby pivotally connected to ears 45 of bracket 44.

Mounting bracket 44 is affixed to panel closure 24 by lugs 48 which are received through holes 49 of bracket 44.

Channel housing 36 of handle 32 includes side flanges 50 having holes formed therein to receive toggle pin 35, thereby pivotally connecting toggle arm 34 to handle 32. Toggle arm 34 includes at each end thereof pivot members 52 and 54. Pivot member 52 is adapted to receive pin 35 so as to be pivotally connected to the lower end of handle 32; and pivot member 54 is adapted to receive anchor pivot pin 56 so as to be pivotally connected to a demountable anchor means 60.

The demountable anchor means 60 comprises an anchor bracket 62 having a pair of extended flanges 64 which are adapted to receive therebetween pivot member 54 of toggle arm 34 whereby pin 56 pivotally connects arm 34 and anchor bracket 62. Accordingly, there is established three articulated and jointed connections, the first being formed between panel-mounting bracket 44 and latch handle 32; the second being formed between latch handle 32 and toggle arm 34; and the third being formed between toggle arm 34 and anchor bracket 60. Thus, this arrangement permits a sealed-closed mode of panel 24 and an open-vent mode of panel 24, when the latching device is fully opened.

However, the anchor means 60 also includes means whereby the anchor bracket is demountably secured to the fixed frame structure 18. This means comprises a detachable locking means defined by a pair of locking cleats 65 which are rotatably mounted to anchor bracket 62. Each cleat 65 comprises a knob member 66 having a projecting cleat member 68 that is rotatably supported in aperture 70 formed on each end of bracket 62, as seen in FIG. 10. The projecting cleat member 68 includes a locking head 72 which is adapted to be received in a lock channel 74 formed in the fixed frame structure 18. Lock channel 74 is provided with inturned, longitudinal, lip members 75, each having inwardly beveled edges 76 to match with an annular, beveled, rib member 73 positioned adjacent lock head 72 of cleat 68.

In FIG. 7, knob 66 is turned downwardly in an unlocked position whereby the anchor bracket can be removed from lock channel 74. However, in FIG. 8 the knob 66 is shown rotated to a locked position wherein lock head is locked against the inner sides of lip members 75. That is, lock head 72 is provided with offset keeper member 78 that projects outwardly from head 72, keeper members 78 passing through channel slot 80 when knob 66 is turned downwardly, as in FIG. 7; and, as knob 66 is rotated to the position shown in FIG. 8, each keeper member catches behind lips 75, thereby locking the entire latching device to the fixed frame structure 18.

Thus, it can be understood that, when the cleats are in an unlocked mode, the anchor bracket is freed from the frame 18; and the panel can be disengaged or removed from the fixed frame 18 by means of the releasable hinges 28.

However, in order to control the rotation of locking cleats 65, a means for limiting the rotation of cleat 65 from a locked to an unlocked position is provided, whereby the knob can be moved to only a quarter of a turn.

The quarter-turn limitation is provided by an arcuate groove 82 formed in the face of bracket 62 wherein a stop pin 84 is received therein, the stop pin being formed in knob 66.

Further included in anchor-bracket means 60 is an alignment means comprising an elongated key-rib member 86 adapted to be received in channel slot 80—and including an elongated, inturned, shoulder member 88 that engages the lower surface of the fixed frame structure 18. When anchor bracket 62 is to be replaced and secured to the fixed frame 18, the key rib 86 is simply aligned within slot 80, and shoulder member 88 is pressed against the frame whereby each cleat 65 is aligned and received in channel 74. Each cleat is rotated ninety degrees to a locked position; and the latching device is again secured in place, with panel 24 ready to be sealed closed against sealing gasket 90, as seen in FIG. 3.

Referring to FIG. 11, there is shown an alternative arrangement of the mounting bracket 44 wherein a single lug 48 is provided with a depending ear 45a which is received in groove 39 of latch handle 32.

The invention and its attendant advantages will be understood from the foregoing description, and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. A detachable latching device for a closure panel having a fixed frame structure, wherein the device comprises:
    a toggle-jointed latch member interconnecting said closure panel to said fixed frame structure;
    a mounting bracket affixed adjacent one edge of said closure panel, one end of said toggle-jointed latch member being adapted to be movably attached thereto;
    a demountable anchor means arranged to be releasably secured to said fixed frame structure and movably mounted to said toggle-jointed latch member at the end opposite the mounting bracket, wherein said demountable anchor means comprises an anchor bracket having extended flange members adapted to be connected to one end of said toggle-jointed latch member; and
    releasable locking means mounted to said anchor means for locking engagement with said fixed frame structure, wherein said releasable locking means comprises lockable cleat members rotatably mounted to said anchor bracket so as to lockably engage said frame structure.

2. A detachable latching device as recited in claim 1, wherein said toggle-jointed latch member comprises:
    a latch-handle member having one end thereof pivotally attached to said mounting bracket; and
    a toggle-arm member having one end thereof pivotally connected to one end of said latch-handle member, and the opposite end thereof pivotally connected to said anchor bracket; and wherein pivot means is provided at each pivotal connection to allow articulate movement of said toggle-jointed latch member whereby said closure panel can be positioned in a closed or open mode.

3. A detachable latching device as recited in claim 2, wherein there is included means for limiting the rotational movement of said cleat members to a lock and unlocked position, said means being located between said cleat members and said anchor bracket.

4. A detachable latching device as recited in claim 3, wherein said limiting means comprises:
    an arcuate groove formed in the face of said anchor bracket; and
    a stop pin formed in said cleat members and positioned to be received in said arcuate groove.

5. A detachable latching device as recited in claim 3, wherein said frame structure includes a channel slot adapted to receive said cleat members therein.

6. A detachable latching device as recited in claim 5, wherein said cleat members comprise:
    a knob member having a projecting cleat-body member wherein said body member includes a lock head adapted to pass through said channel slot of said frame structure, said frame structure having inturned lip members, whereby said lock head engages said lip members when said cleat member is rotated to a locked position.

7. A detachable latching device as recited in claim 6, wherein said anchor bracket includes:
    a key-rib member positioned thereon to engage within said channel slot of said frame structure; and
    a shoulder member located to engage said frame structure along the longitudinal edge thereof, to provide linear placement of said anchor bracket with respect to the linearly disposed channel slot.

8. A detachable latching device as recited in claim 6, wherein said cleat member further includes an annular, beveled rib member positioned adjacent said lock head, whereby said annular rib member directly engages said lip members of said channel slot.

9. A detachable latching device as recited in claim 2, including means for fixedly attaching said mounting bracket to said closure panel.

10. A detachable latching device as recited in claim 9, wherein said closure panel is formed from glass.

* * * * *